United States Patent
Ostaszewski

(10) Patent No.: US 12,130,423 B1
(45) Date of Patent: Oct. 29, 2024

(54) TWO DEGREE-OF FREEDOM REACTIONLESS POINTING AND SCANNING SYSTEM

(71) Applicant: Ball Aerospace & Technologies Corp., Boulder, CO (US)

(72) Inventor: Miroslaw A. Ostaszewski, Louisville, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 637 days.

(21) Appl. No.: 17/397,637

(22) Filed: Aug. 9, 2021

Related U.S. Application Data

(60) Provisional application No. 63/064,505, filed on Aug. 12, 2020.

(51) Int. Cl.
  *G02B 26/08* (2006.01)
  *G02B 26/10* (2006.01)

(52) U.S. Cl.
  CPC ....... *G02B 26/0825* (2013.01); *G02B 26/101* (2013.01)

(58) Field of Classification Search
  CPC .......................... G02B 26/0825; G02B 26/101
  See application file for complete search history.

(56) References Cited

U.S. PATENT DOCUMENTS

| 854,426 | A | 5/1907 | Lowry |
| 1,013,786 | A | 1/1912 | Lambert |
| 1,334,557 | A | 3/1920 | Ruff |
| 1,602,912 | A | 10/1926 | Leipert |
| 1,952,970 | A | 3/1934 | Brofelth |
| 2,484,823 | A | 10/1949 | Hammond, Jr. |
| 2,990,720 | A | 7/1961 | Scholtes |
| 3,060,334 | A | 10/1962 | Favre |
| 3,156,759 | A | 11/1964 | Collen |
| 3,181,851 | A | 5/1965 | Troeger |
| 3,181,918 | A | 5/1965 | Troeger |
| 3,188,071 | A | 6/1965 | Owen |

(Continued)

FOREIGN PATENT DOCUMENTS

| DE | 3241373 | 5/1984 |
| EP | 0348845 | 1/1990 |

(Continued)

OTHER PUBLICATIONS

Markovic et al. "Characterization of cross-spring pivots for micropositioning applications," Proceedings of SPIE, Smart Sensors, Actuators, and MEMS VII; and Cyber Physical Systems, May 2015, vol. 9517, 951727, 8 pages.

(Continued)

*Primary Examiner* — Euncha P Cherry
(74) *Attorney, Agent, or Firm* — Sheridan Ross P.C.

(57) ABSTRACT

Suspension system structures and methods are provided. A system as disclosed includes a supported object that is mounted to a post by a first two axis gimbal. The system also includes a reaction mass that is mounted to the post by a second two axis gimbal. The supported object and the reaction mass are connected to one another by a drive assembly. The drive assembly transfers a rotation of the reaction mass about either of the two axes in a first direction to a rotation of the supported object about a parallel axis in an opposite direction.

20 Claims, 17 Drawing Sheets

(56) References Cited

U.S. PATENT DOCUMENTS

| | | |
|---|---|---|
| 3,234,844 A | 2/1966 | Fain et al. |
| 3,246,890 A | 4/1966 | Ormond |
| 3,252,696 A | 5/1966 | Friedel |
| 3,453,464 A | 7/1969 | Baker, Jr. |
| 3,465,997 A | 9/1969 | Piske |
| 3,469,418 A | 9/1969 | Stabeler et al. |
| 3,532,408 A | 10/1970 | Dostal |
| 3,592,422 A | 7/1971 | Paine et al. |
| 3,612,643 A | 10/1971 | Weber |
| 3,743,268 A | 7/1973 | Heiland |
| 3,807,029 A | 4/1974 | Troeger |
| 3,811,665 A | 5/1974 | Seelig |
| 3,813,089 A | 5/1974 | Troeger |
| 3,825,992 A | 7/1974 | Troeger |
| 3,909,077 A | 9/1975 | Leonarduzzi |
| 3,952,217 A | 4/1976 | Rawlings |
| 3,981,566 A | 9/1976 | Frank et al. |
| 3,998,092 A | 12/1976 | Maccabee |
| 4,025,203 A | 5/1977 | Lee |
| 4,060,315 A | 11/1977 | Heinz |
| 4,160,177 A | 7/1979 | Ascoli |
| 4,230,291 A | 10/1980 | Marshall, II |
| 4,261,211 A | 4/1981 | Haberland |
| 4,302,709 A | 11/1981 | Tichtinsky |
| 4,306,463 A | 12/1981 | King |
| 4,327,527 A | 5/1982 | Seelig et al. |
| 4,380,108 A | 4/1983 | Craig |
| 4,382,709 A | 5/1983 | Brown |
| 4,439,003 A | 3/1984 | Roth |
| 4,460,252 A | 7/1984 | Volleau et al. |
| 4,497,465 A | 2/1985 | Yeakley et al. |
| 4,507,979 A | 4/1985 | Zebrowski |
| 4,511,115 A | 4/1985 | Ludwigsen |
| 4,533,100 A | 8/1985 | Paseri |
| 4,538,882 A | 9/1985 | Tanaka et al. |
| 4,540,141 A | 9/1985 | Durno et al. |
| 4,613,203 A | 9/1986 | Proetel et al. |
| 4,619,498 A | 10/1986 | Croiset |
| 4,637,596 A | 1/1987 | Lewis |
| 4,655,629 A | 4/1987 | Flaherty |
| 4,678,295 A | 7/1987 | Fisher |
| 4,723,456 A | 2/1988 | Kohler et al. |
| 4,732,440 A | 3/1988 | Gadhok |
| 4,738,500 A | 4/1988 | Grupp et al. |
| 4,770,522 A | 9/1988 | Alten |
| 4,782,475 A | 11/1988 | Chandler |
| 4,802,720 A | 2/1989 | Paulsen |
| 4,802,784 A | 2/1989 | Brooks |
| 4,812,072 A | 3/1989 | Brooks |
| 4,825,713 A | 5/1989 | Wilkey |
| 4,861,125 A | 8/1989 | Vaught |
| 4,902,083 A | 2/1990 | Wells |
| 4,919,382 A | 4/1990 | Forman |
| 4,919,993 A | 4/1990 | Woodruff |
| 4,932,210 A | 6/1990 | Julien et al. |
| 4,973,145 A | 11/1990 | Kirkwood et al. |
| 4,977,791 A | 12/1990 | Erichsen |
| 4,997,123 A | 3/1991 | Backus et al. |
| 5,009,473 A | 4/1991 | Hunter et al. |
| 5,015,831 A | 5/1991 | Eastman et al. |
| 5,066,084 A | 11/1991 | Culp |
| 5,097,356 A | 3/1992 | Paulsen |
| 5,110,195 A | 5/1992 | Loney |
| 5,267,720 A | 12/1993 | Brazell et al. |
| 5,277,076 A | 1/1994 | Ostaszewski |
| 5,283,682 A | 2/1994 | Ostaszewski |
| 5,315,890 A | 5/1994 | Long |
| 5,521,740 A | 5/1996 | Brosens |
| 5,529,277 A | 6/1996 | Ostaszewski |
| 5,620,169 A | 4/1997 | Payne |
| 5,703,732 A | 12/1997 | Boddy et al. |
| 6,275,624 B1 | 8/2001 | Seddon |
| 6,283,666 B1 | 9/2001 | Genequand |
| 6,300,665 B1 | 10/2001 | Peeters et al. |
| 6,327,065 B1 | 12/2001 | Danial et al. |
| 6,365,252 B1 | 4/2002 | Ortiz et al. |
| 6,428,929 B1 | 8/2002 | Koy et al. |
| 6,661,962 B1 | 12/2003 | Calvet et al. |
| 6,862,122 B1 | 3/2005 | Moore |
| 6,972,885 B2 | 12/2005 | Hiley et al. |
| 7,227,111 B2 | 6/2007 | Eckelkamp-Baker et al. |
| 7,354,170 B2 | 4/2008 | Ishikawa |
| 7,515,385 B1 | 4/2009 | Abrahamson et al. |
| 7,538,959 B1 | 5/2009 | Wheeler |
| 8,556,533 B2 | 10/2013 | Bullard |
| 8,702,337 B2 | 4/2014 | Whitney et al. |
| 8,708,593 B2 | 4/2014 | Stratton |
| 8,724,095 B2 | 5/2014 | Goodwin et al. |
| 9,057,610 B2 | 6/2015 | Graesser et al. |
| 9,212,691 B2 | 12/2015 | Smith |
| 9,354,422 B1 | 5/2016 | Quakenbush |
| 9,612,436 B1 | 4/2017 | Hoffman et al. |
| 9,880,263 B2 | 1/2018 | Droz et al. |
| 9,954,612 B1 | 4/2018 | La Fata |
| 10,139,617 B2 | 11/2018 | Bullard |
| 10,443,649 B2 | 10/2019 | Balaban et al. |
| 10,591,676 B1 | 3/2020 | Ostaszewski et al. |
| 10,598,924 B2 | 3/2020 | Ostaszewski |
| 10,914,339 B2 | 2/2021 | Warden |
| 2002/0101287 A1 | 8/2002 | Fowler |
| 2002/0176683 A1 | 11/2002 | Harman et al. |
| 2003/0026526 A1 | 2/2003 | Trissel et al. |
| 2004/0140737 A1 | 7/2004 | Barillot et al. |
| 2005/0173770 A1 | 8/2005 | Linden et al. |
| 2005/0179976 A1 | 8/2005 | Davis et al. |
| 2005/0280879 A1 | 12/2005 | Gibson et al. |
| 2006/0062528 A1 | 3/2006 | Morris et al. |
| 2008/0219705 A1 | 9/2008 | Lee |
| 2009/0245307 A1 | 10/2009 | Iida et al. |
| 2010/0208322 A1 | 8/2010 | Borchers |
| 2012/0236379 A1 | 9/2012 | da Silva et al. |
| 2014/0208848 A1 | 7/2014 | Krylov et al. |
| 2016/0259252 A1 | 9/2016 | Suzuki et al. |
| 2018/0095223 A1 | 4/2018 | Wiley et al. |
| 2018/0252260 A1* | 9/2018 | Bullard ............... F16C 11/12 |
| 2018/0252261 A1 | 9/2018 | Bullard |
| 2019/0120287 A1 | 4/2019 | Cosandier et al. |
| 2020/0008827 A1 | 1/2020 | Dearden et al. |
| 2021/0263292 A1 | 8/2021 | Visser et al. |

FOREIGN PATENT DOCUMENTS

| | | |
|---|---|---|
| EP | 1013949 | 6/2000 |
| EP | 1887398 | 2/2008 |
| EP | 3324193 | 5/2018 |
| GB | 939741 | 10/1963 |
| GB | 1454427 | 11/1976 |

OTHER PUBLICATIONS

U.S. Appl. No. 17/675,024, filed Feb. 18, 2022, Renken et al.

U.S. Appl. No. 17/723,142, filed Apr. 18, 2022, Balaban et al.

Allegranza et al. "Actuators for Space Applications: State of the Art and New Technologies," Actuator 2014, 14th International Conference on New Actuators, Jun. 23-25, 2014, Bremen, Germany, pp. 283-288, 38 pages.

Awtar et al. "An XYZ Parallel-Kinematic Flexure Mechanism With Geometrically Decoupled Degrees of Freedom," Journal of Mechanisms and Robotics, Feb. 2013, vol. 5, No. 1, 015001, 8 pages.

Letty et al. "Miniature Piezo Mechanisms for Optical and Space Applications," Actuator 2004, 9th International Conference on New Actuators, Jun. 14-16, 2004, Bremen, Germany, pp. 177-180.

Shimizu et al. "Development of Fine Pointing Mechanism for Optical Inter-Satellite Communication," Proceedings of the International Conference on Space Optical Systems and Applications (ICSOS), May 7-9, 2014, Kobe, Japan, 7 pages.

Syms et al. "Scalable electrothermal MEMS actuator for optical fibre alignment," Journal of Micromechanics and Microengineering, 2004, vol. 14, pp. 1633-1639.

(56) References Cited

OTHER PUBLICATIONS

Wang et al. "Four-plate piezoelectric actuator driving a large-diameter special optical fiber for nonlinear optical microendoscopy," Optics Express, Aug. 2016, vol. 24, No. 17, pp. 19949-19960.

* cited by examiner

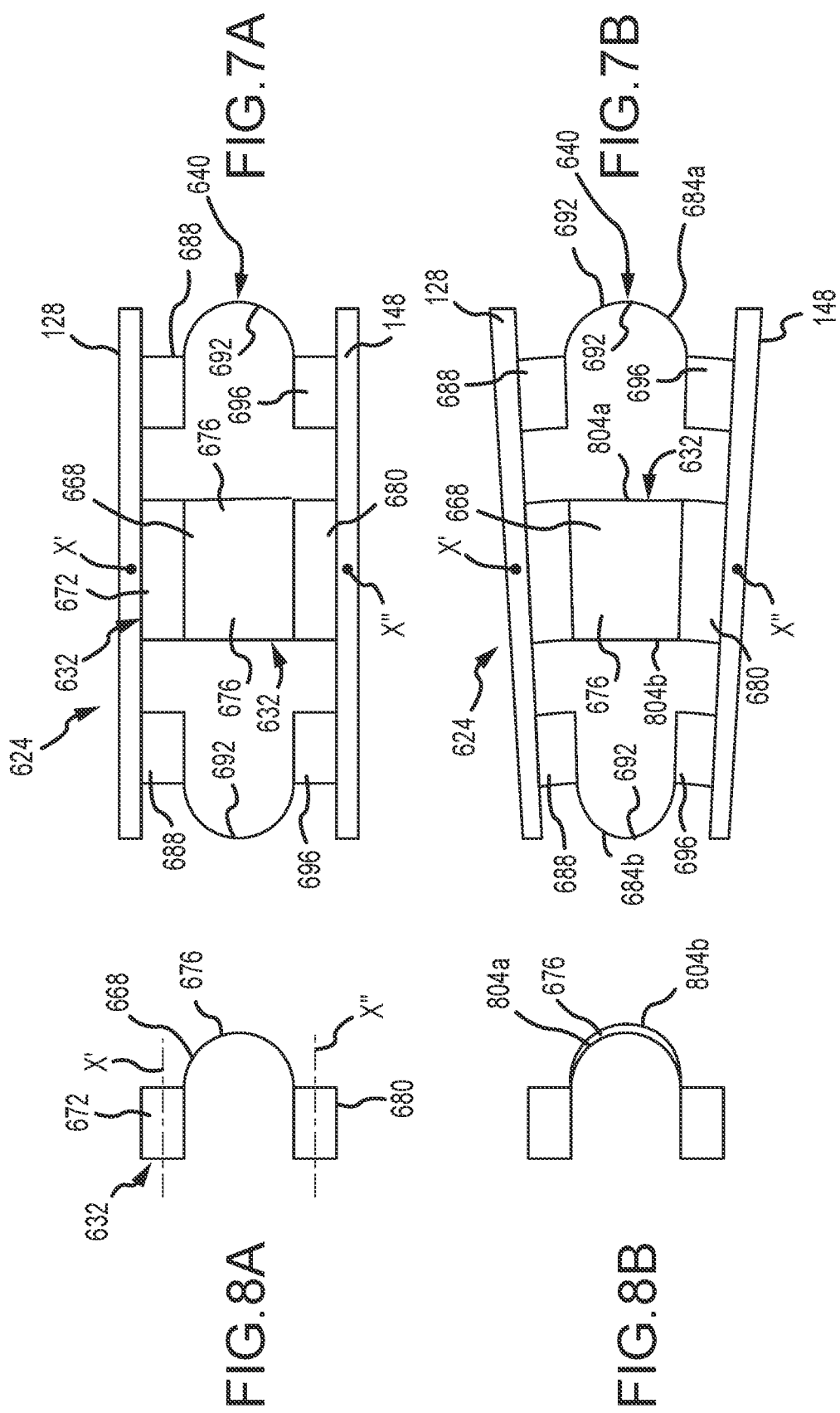

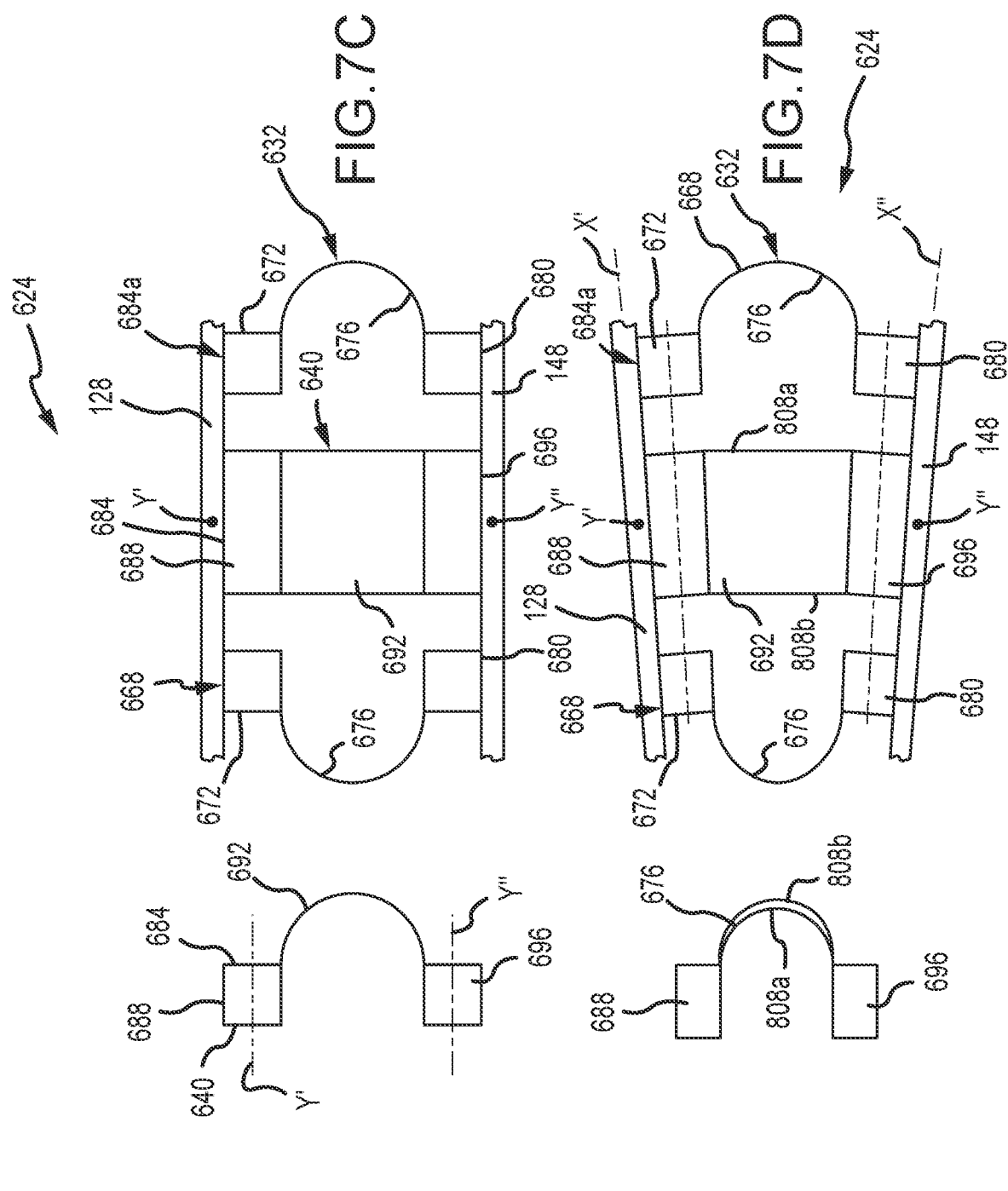

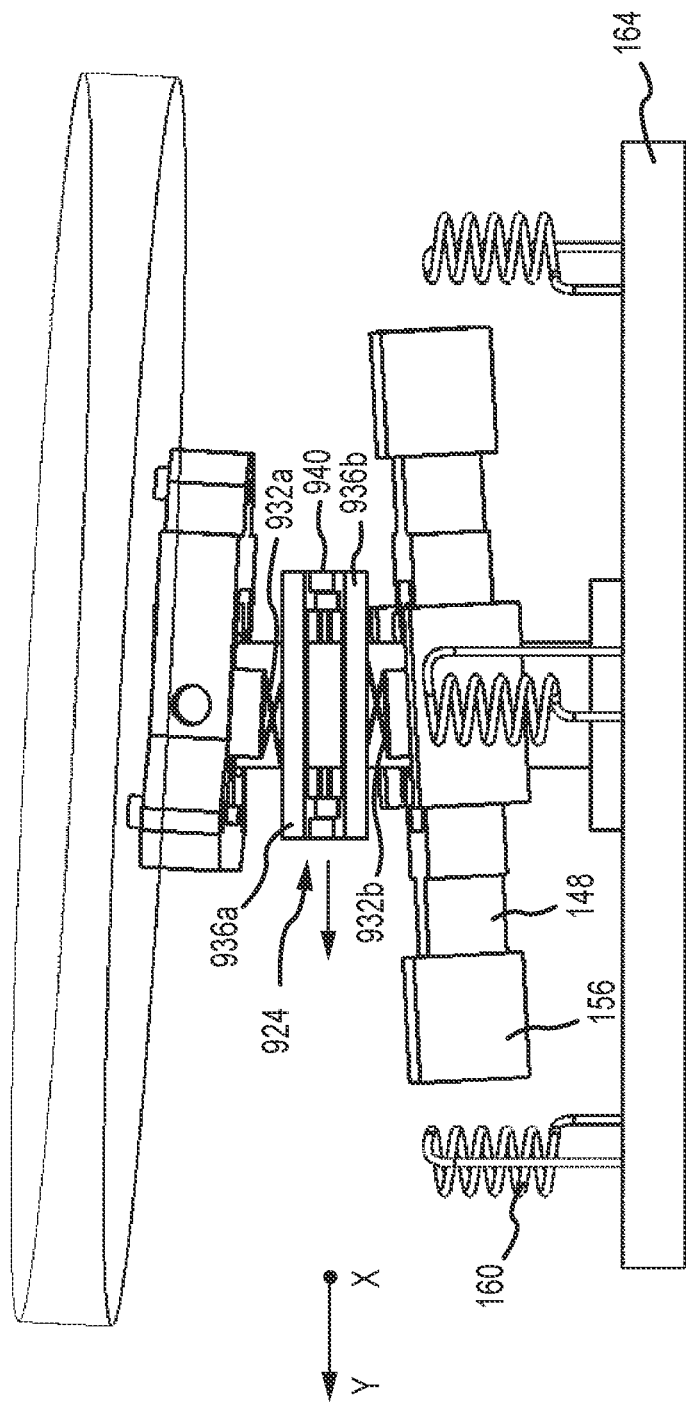

TWO DEGREE-OF FREEDOM REACTIONLESS POINTING AND SCANNING SYSTEM

CROSS-REFERENCE TO RELATED APPLICATIONS

This application claims the benefit of U.S. Provisional Patent Application Ser. No. 63/064,505, filed Aug. 12, 2020, the entire disclosure of which is hereby incorporated herein by reference.

FIELD

The present disclosure provides a reactionless pointing and scanning system for supporting objects, such as mirrors, that allows for rotation about two perpendicular axes.

BACKGROUND

Suspension systems for supporting an object that allow for rotation or oscillation of the object about one or more axes, while limiting or minimizing any translational movement of the object, are used in various applications. For example, optical scanning systems require a flexible suspension system that enables precise control of a supported element. More particularly, in a steering mirror type optical scanning system, a mirror is actuated to rapidly scan back and forth across an angular excursion under precise control. However, supporting a scanning mirror or other optical component while at the same time enabling precise control of the supported element about multiple axes has been a challenge.

In various applications it is desirable to provide a reactionless or reaction compensated scan mechanism, while minimizing mass and power requirements. For example, reactionless operation is desirable for scanning systems carried on spacecraft, in order to avoid perturbing the spacecraft. However, previous reactionless systems have been limited to a single degree of freedom. Other systems have required actuators for both the mirror and the reaction mass, increasing complexity and power requirements.

Accordingly, it would be desirable to provide a scan mechanism that enabled a mirror or other component to be supported in a way that enabled high scanning accuracy and a rapid scan rate about multiple axes, while providing reactionless operation.

SUMMARY

Embodiments of the present disclosure provide a two axis or two degree-of-freedom (DOF) suspension system or support mechanism. The suspension system can be used as a steering mirror suspension that allows tip-tilt motions to steer a beam or otherwise point an optical system. In addition, the suspension system provides for reactionless operation for movements about the two axes. Moreover, the suspension system enables such operation while requiring a relatively small mass and a relatively low amount of power.

A suspension system in accordance embodiments of the present disclosure includes a base mounting structure with a post. A mirror is connected to the post by a first or mirror gimbal that allows the mirror to move relative to the post about two axes X' and Y'. A reaction mass is connected to the post by a second or reaction mass gimbal that allows the reaction mass to move relative to the post about two axes X" and Y", where the X' axis is parallel to the X" axis and to a reference axis X, and where the Y' axis is parallel to the Y" axis and to a reference axis Y. A set of coils mounted to a base interact with a number of magnets that are fixed to the reaction mass, enabling an angle of the reaction mass about one or both of the X" and Y" axes to be selectively changed. The mirror is joined to the reaction mass by a drive assembly. The drive assembly includes a first flexure or set of flexures that transfers a rotation of the reaction mass about the X" axis to an equal but opposite rotation of the mirror about the X' axis. The drive assembly also includes a second flexure of set of flexures that transfers a rotation of the reaction mass about the Y" axis to an equal but opposite rotation of the mirror about the Y' axis.

In accordance with at least some embodiments of the present disclosure, the first flexure includes first and second sets of cross flexures, and the second flexure also includes first and second sets of cross flexures. In accordance with further embodiments of the present disclosure, the first flexure can include first and second pairs of cross flexure blade sets, with the first pair connected to a first end of the second flexure set of flexures by a first or upper drive flexure frame, and the second pair connected to a second end of the second flexure set of flexures by a second or lower drive flexure frame. In accordance with still other embodiments of the present disclosure, the first and second flexures can include flexible blade portions having a C-shaped profile.

Additional features and advantages of embodiments of the present disclosure will become more readily apparent from the following description, particularly when taken together with the accompanying drawings.

BRIEF DESCRIPTION OF THE DRAWINGS

FIGS. 7A, 7B, 7C and 7D are side elevation views of a drive assembly that includes C-drive elements in accordance with embodiments of the present disclosure;

FIGS. 8A, 8B, 8C and 8D are side elevation views of a C-drive element in accordance with embodiments of the present disclosure;

FIGS. 9A, 9B, and 9C are side elevation views of a two degree of freedom reactionless scanning system in accordance with other embodiments of the present disclosure.

DETAILED DESCRIPTION

Figure 1A:
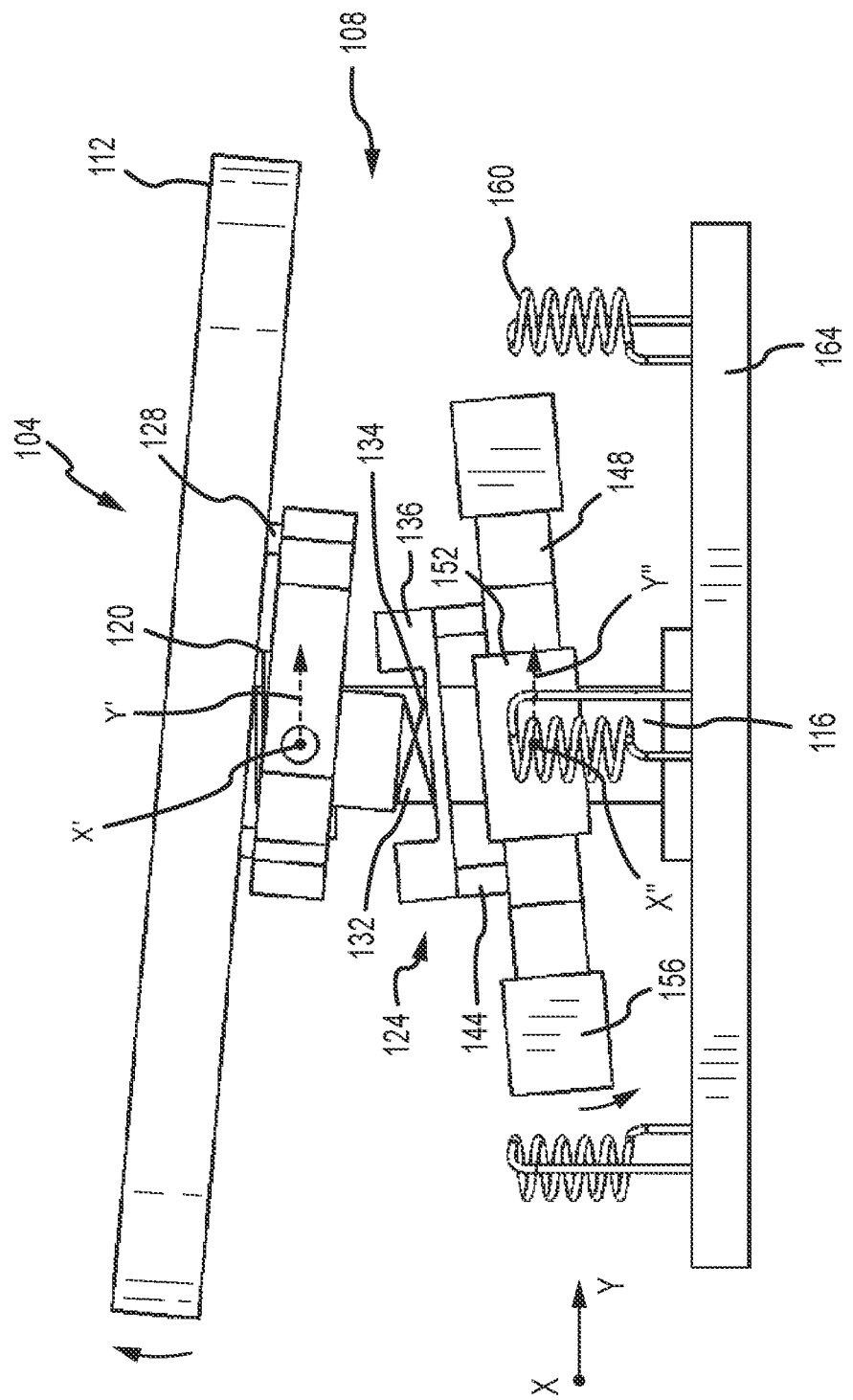
FIGS. 1A and 1B are side elevation views of a scanning mirror assembly incorporating a two degree-of-freedom reactionless suspension system in accordance with embodiments of the present disclosure.
Figure 1B:
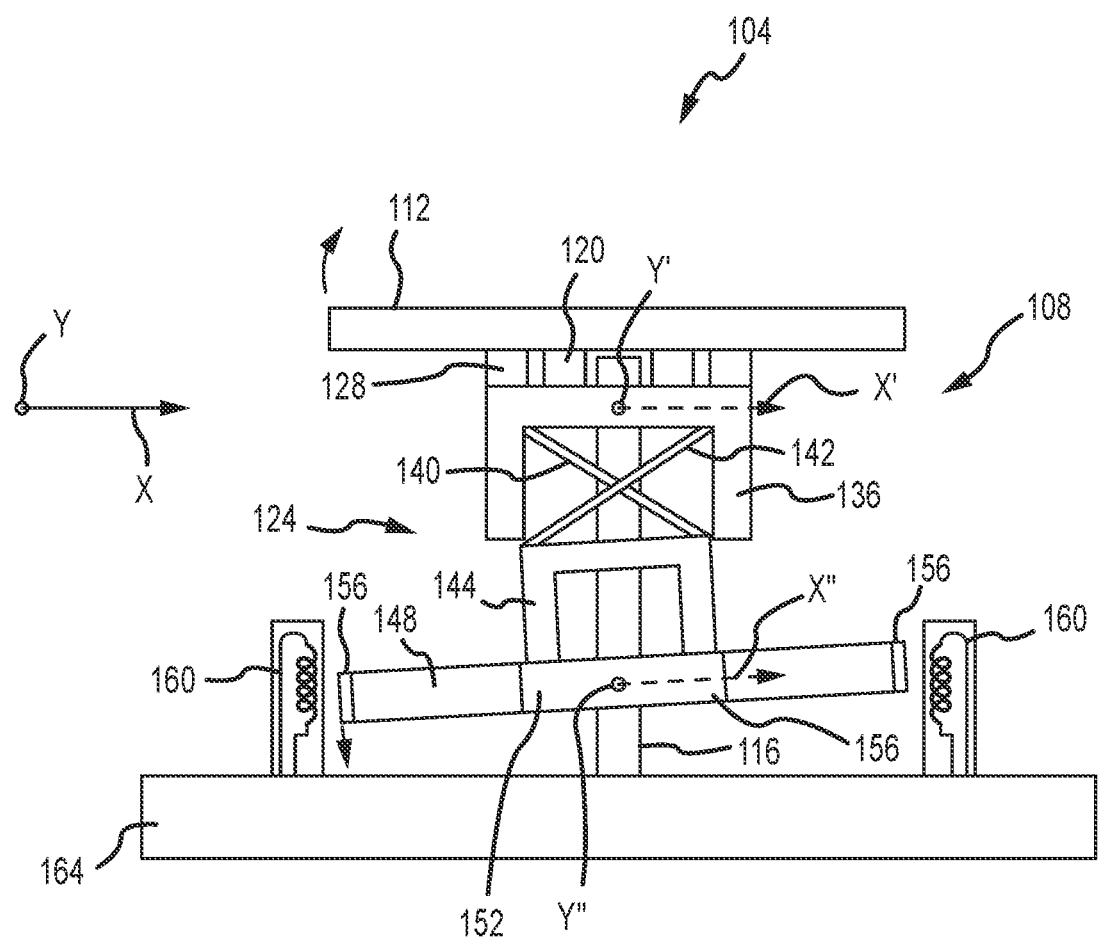
Figure 2A:
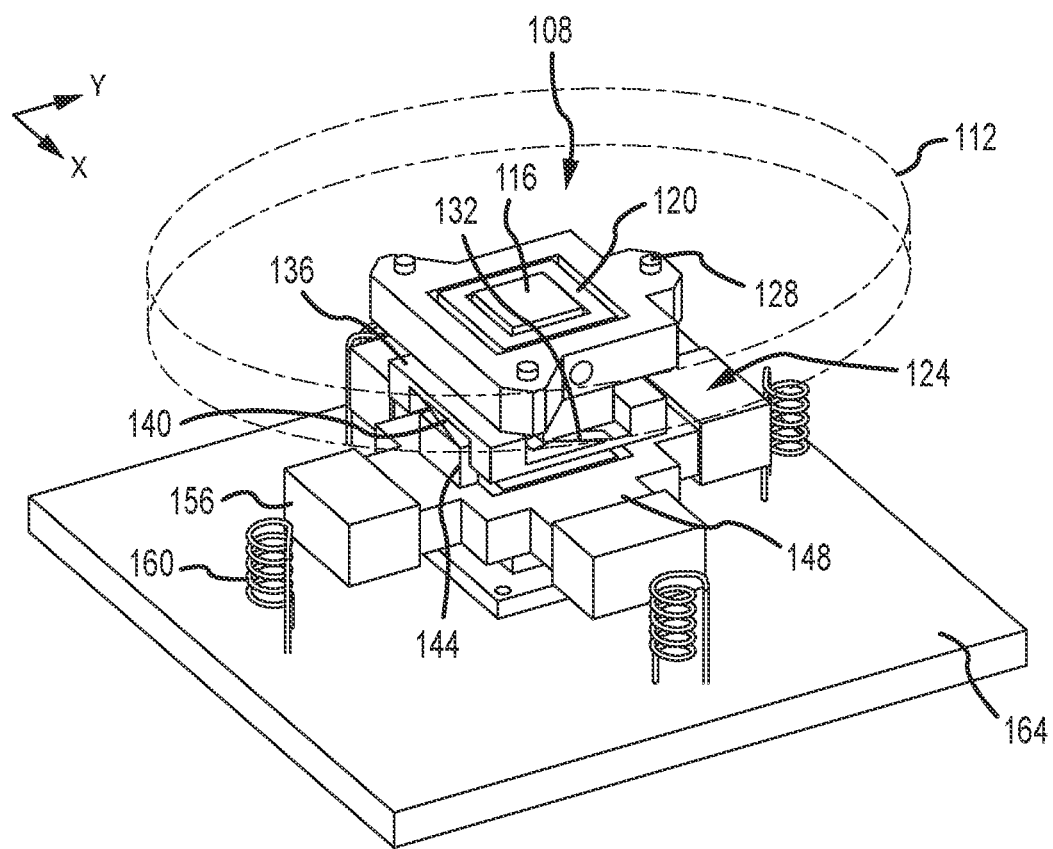
FIGS. 2A, 2B and 2C are perspective views of a two degree of freedom reactionless scanning system in accordance with embodiments of the present disclosure.
Figure 2B:
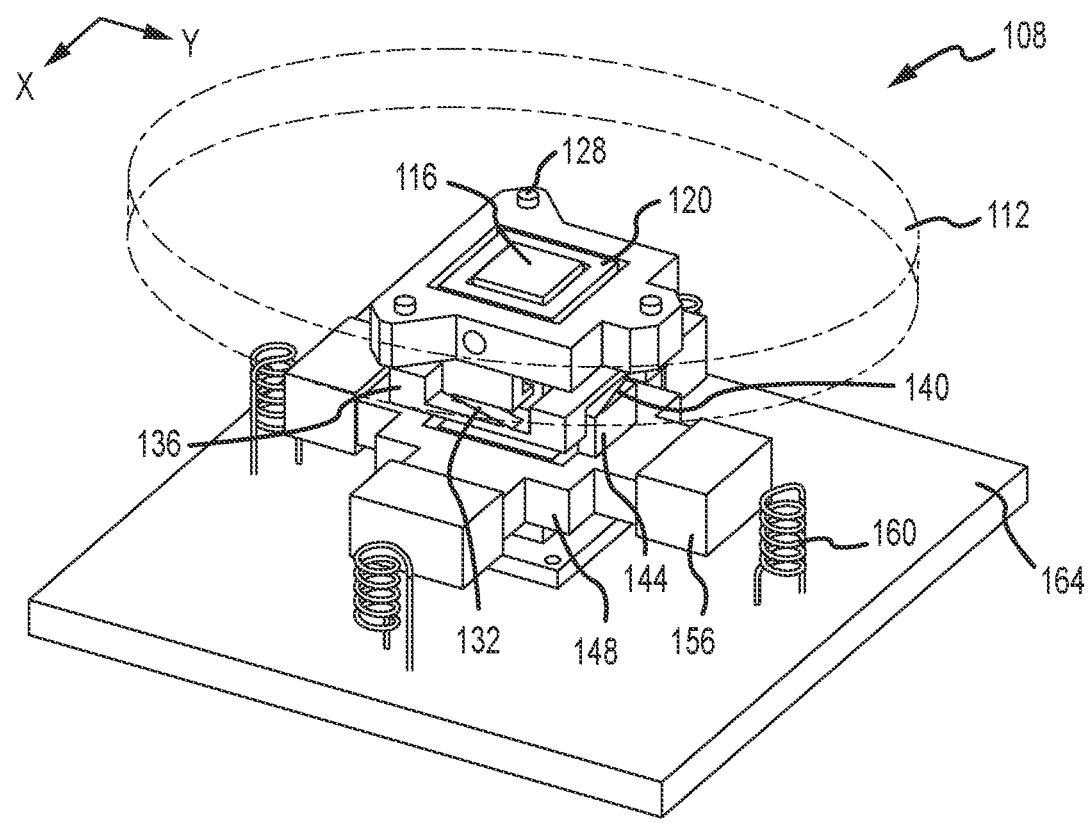
Figure 2C:
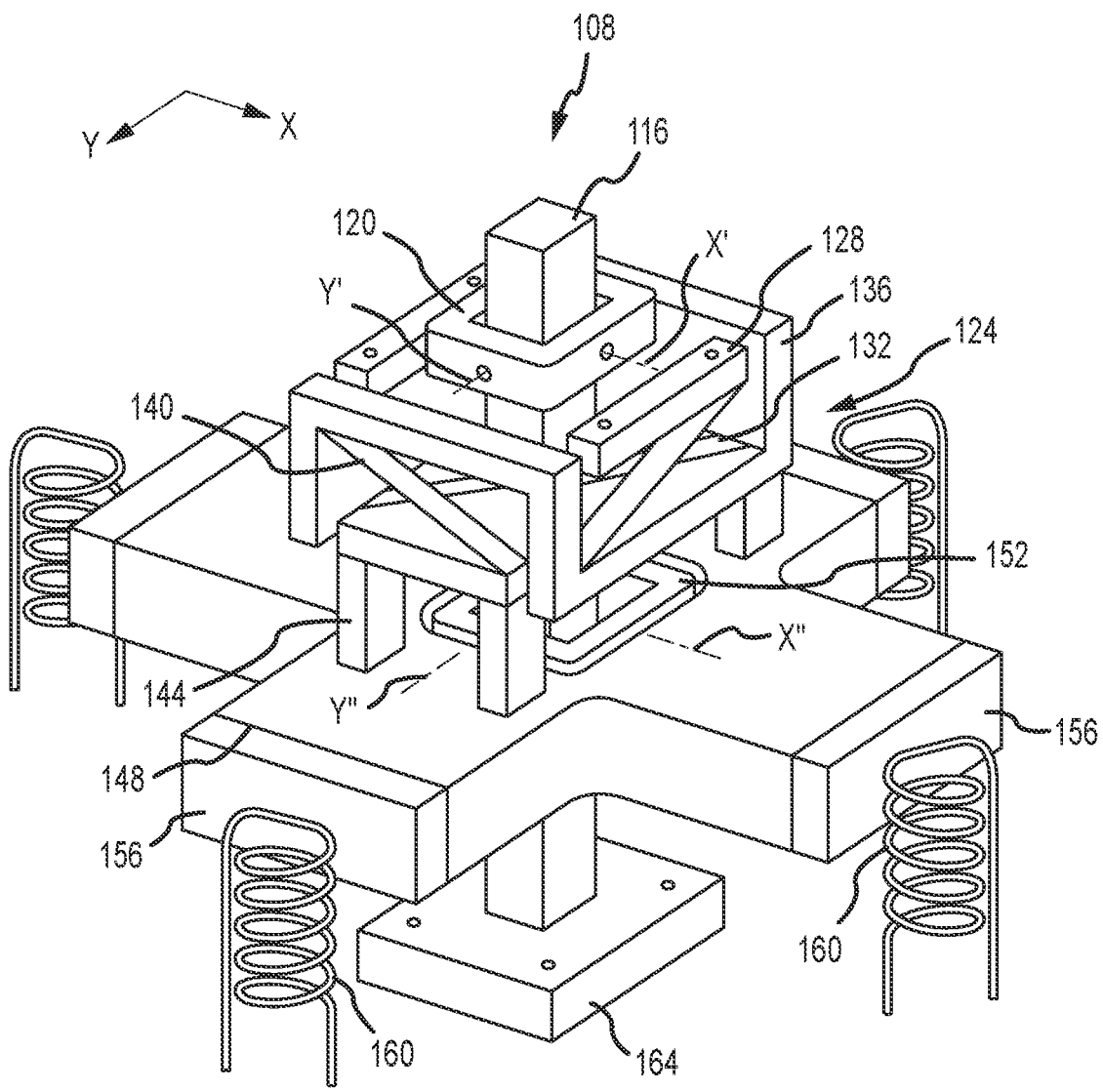

FIG. 1A is a side elevation view of a scanning mirror assembly 104 incorporating a two degree-of-freedom reactionless pointing and scanning system 108, hereinafter referred to as the scanning system 108, looking along an X axis direction. FIG. 1B is a side elevation view of the scanning mirror assembly of FIG. 1A, looking along a Y axis direction. FIGS. 2A-2C are perspective views of components of the scanning mirror assembly 104 of FIGS. 1A and 1B. As shown in the figures, the scanning mirror assembly 104 includes a scanning mirror or other supported object 112 that is joined to a post 116 by a mirror gimbal assembly 120. The mirror gimbal assembly 120 allows the mirror 112 to rotate about first X' and second Y' axes. In accordance with embodiments of the present disclosure, the X' and Y' axes are perpendicular to one another and lie in a first plane that is parallel to a plane defined by the X and Y axes.

The scanning mirror assembly 104 also includes a reaction mass 148 that is joined to the post 116 by a reaction mass gimbal assembly 152. The reaction mass gimbal assembly 152 allows the reaction mass 148 to rotate about third X" and fourth Y" axes. In accordance with embodiments of the present disclosure, the X" and Y" axes are perpendicular to one another and lie in a second plane that is parallel to the first plane. As can be appreciated by one of skill in the art after consideration of the present description in figures, the X' and X" axes are parallel to one another and to the X axis. Similarly, the Y' and Y" axes are parallel to one another and to the Y axis. In accordance with embodiments of the present disclosure, the mass of the reaction mass 148 and the components moving with the reaction mass 148 is equal to the mass of the mirror 112 and the components moving with the mirror 112.

Figure 3:
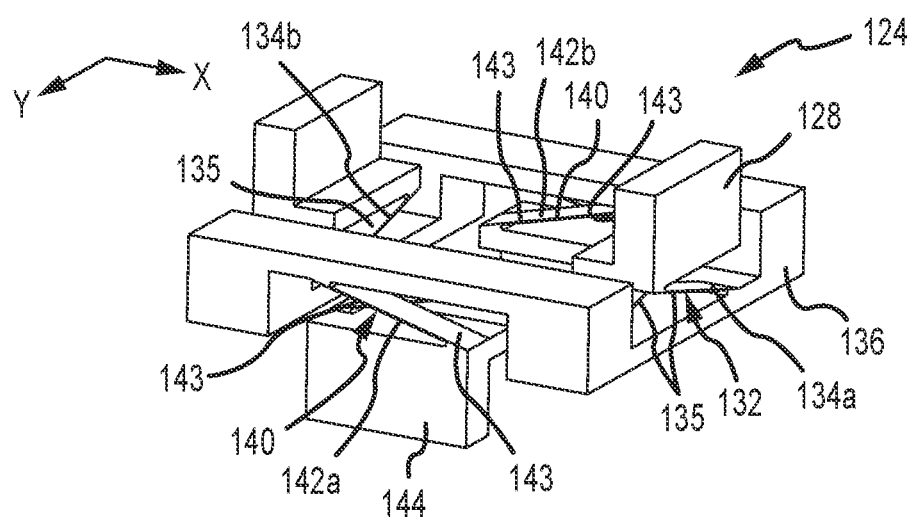
FIG. 3 is a perspective view of a two degree of freedom drive assembly in accordance with embodiments of the present disclosure.
Figure 4A:
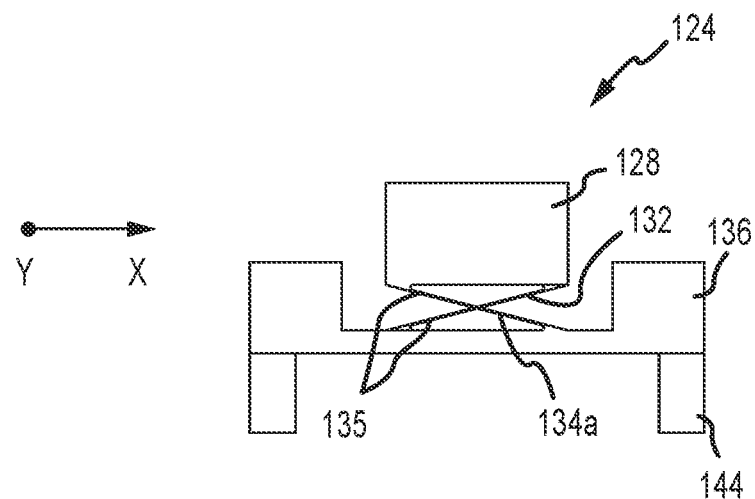
FIGS. 4A and 4B are side elevation views of a two degree of freedom reactionless scanning system in accordance with embodiments of the present disclosure.
Figure 4B:
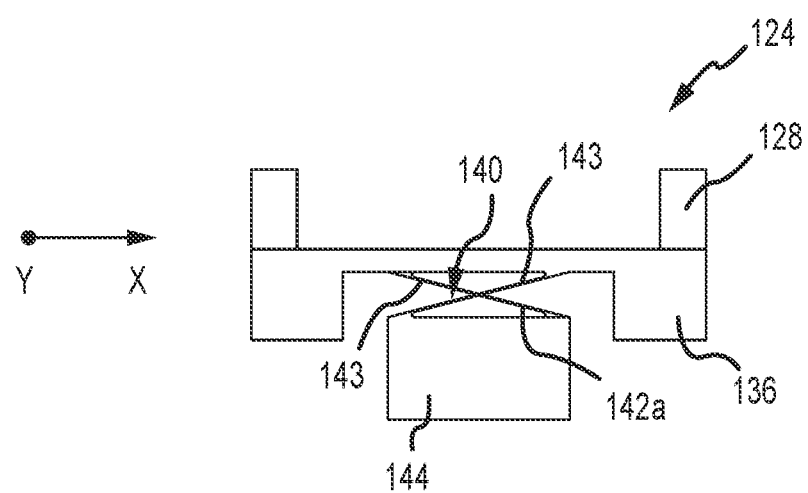

A drive assembly 124 connects the mirror 112 to the reaction mass 148. The drive assembly 124 ensures that a movement of one of the mirror 112 and the reaction mass 148 is accompanied by an equal and opposite movement of the other of the mirror 112 and the reaction mass 148. With additional reference now to FIGS. 3, 4A, and 4B, the drive assembly 124 includes a mirror connection or mount 128 that connects the mirror 112 to a first or X axis drive flexure 132. The X axis drive flexure 132 is in turn connected to a drive flexure frame 136. A second or Y axis drive flexure 140 connects the drive flexure frame 136 to a drive flexure reaction mass connection 144. The drive flexure reaction mass connection 144 is fixed to the reaction mass 148.

The X axis drive flexure 132 can include first 134a and second 134b cross flexure blade sets or elements arranged on opposite sides of the post 116 from one another. Each blade set 134a and 134b in the X axis drive flexure 132 includes two blades 135. In accordance with at least some embodiments of the present disclosure, when the mirror 112 and the reaction mass 148 are parallel to one another, the intersections of the blades 135 of the first and second cross flexure blade sets 134 are centered on an axis that is parallel to the X axis.

The Y axis drive flexure 140 can include third 142a and fourth 142b cross flexure blade sets arranged on opposite sides of the post 116 from one another. Each blade set 142a and 142b in the Y axis drive flexure 140 includes two blades 143. In accordance with the least some embodiments of the present disclosure, when the mirror 112 and the reaction mass 148 are parallel to one another, the intersections of the blades 143 of the third and fourth cross flexure blade sets 142 are centered on an axis that is parallel to the Y axis.

Actuator core magnets 156 can be fixed to the reaction mass 148 in pairs at locations centered on the X" and Y" axes. Accordingly, at least a portion of the "mass" of the reaction mass 148 can be supplied by the actuator core magnets 156. Reaction mass actuator coils 160 can be positioned adjacent the actuator core magnets 156. The post 116 and the actuator coils 160 can be mounted to a base 164. As can be appreciated by one of skill in the art after consideration of the present disclosure, the reaction mass 148 can be selectively tilted about either of both of the X" and Y" axes by operation of the actuator coils 160.

In the example shown in FIGS. 1A-2C, when the actuator coils 160 are operated such that the reaction mass 148 is tipped or rotated about the X" axis in a selected direction, the blade sets 134 of the X axis drive flexure 132 cause the mirror 112 to be tipped about the X' axis by the same amount, but in the opposite direction. This first equal but opposite movement is depicted in FIG. 1A. Similarly, when the actuator coils 160 are operated such that the reaction mass 148 is tipped or rotated about the Y" axis in a selected direction, the blade sets 142 of the Y axis drive flexure 140 cause the mirror 112 to be tipped about the Y' axis by the same amount, but in the opposite direction. This second equal but opposite movement is depicted in FIG. 1B. For example, where the reaction mass 148 is rotated in a counterclockwise direction about a selected axis by 3° relative to a plane defined by reference axes X and Y, the mirror 112 will be rotated in a clockwise direction about the selected axis by 3° relative to that plane.

Figure 5:
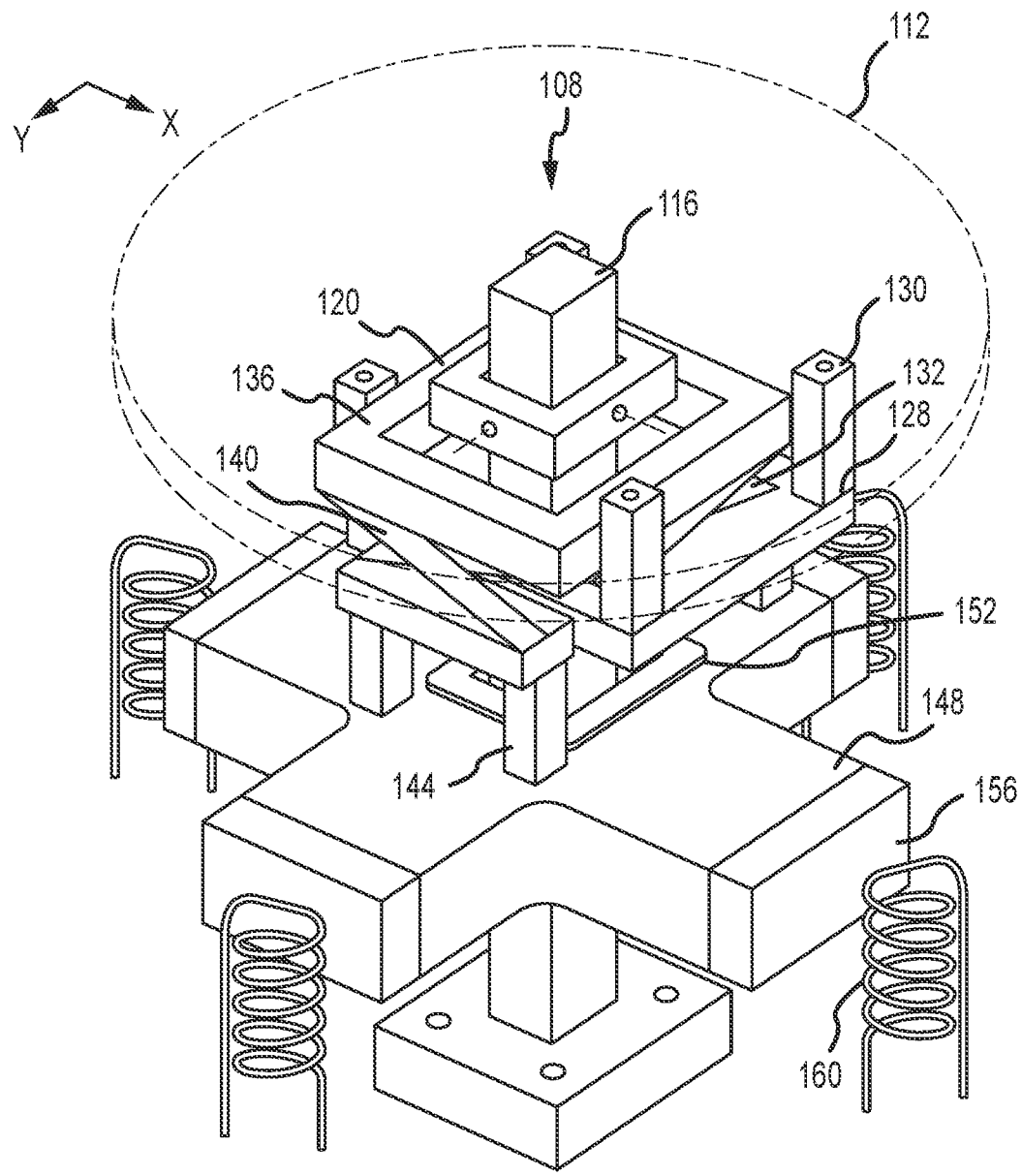
FIG. 5 is a perspective view of a two degree-of-freedom reactionless scanning system in accordance with other embodiments of the present disclosure.

FIG. 5 depicts a scanning system 108 in accordance with other embodiments of the present disclosure. In particular, in FIG. 5 the drive flexure frame 136 of the drive assembly 124 is configured differently from the drive flexure frame 136 illustrated in FIGS. 1 and 2. More particularly, the X axis drive flexure 132 and the Y axis drive flexure connect to the drive flexure frame 136 along a common plane. Also in this embodiment, the mirror connection 128 includes or is interconnected to mirror mounting posts 130.

Figure 6A:
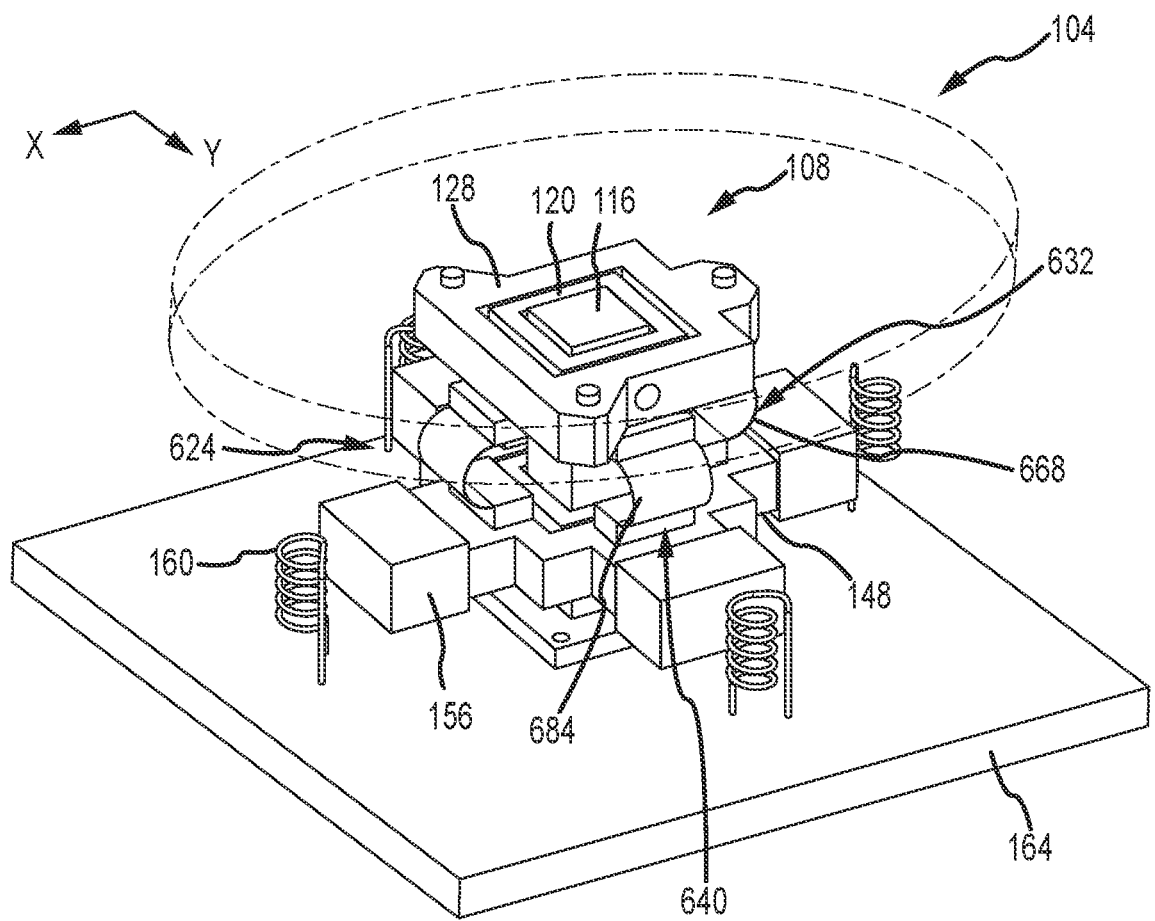
FIGS. 6A, 6B and 6C are perspective views of a two degree of freedom reactionless scanning system that includes C-drive elements in accordance with embodiments of the present disclosure.
Figure 6B:
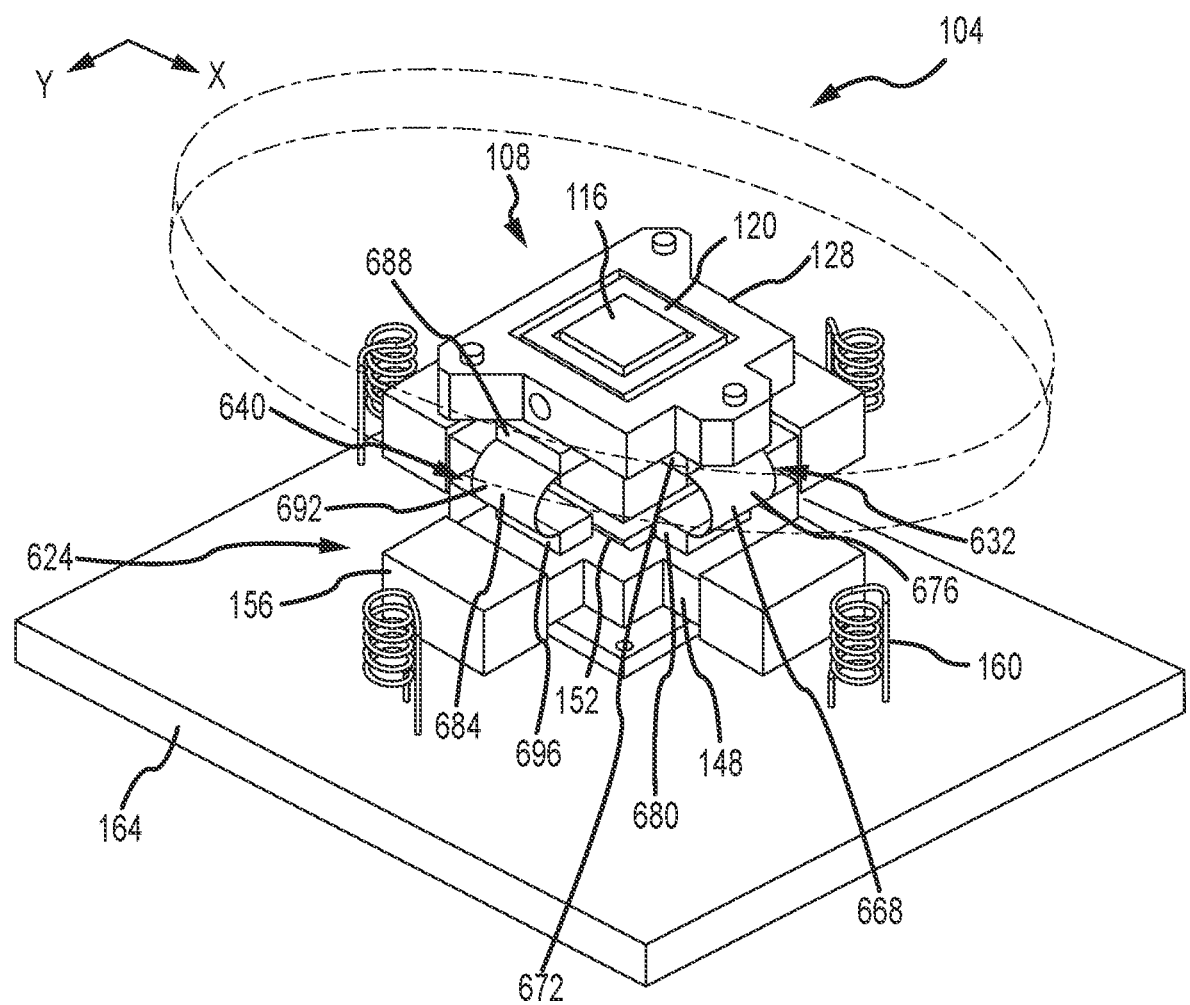
Figure 6C:
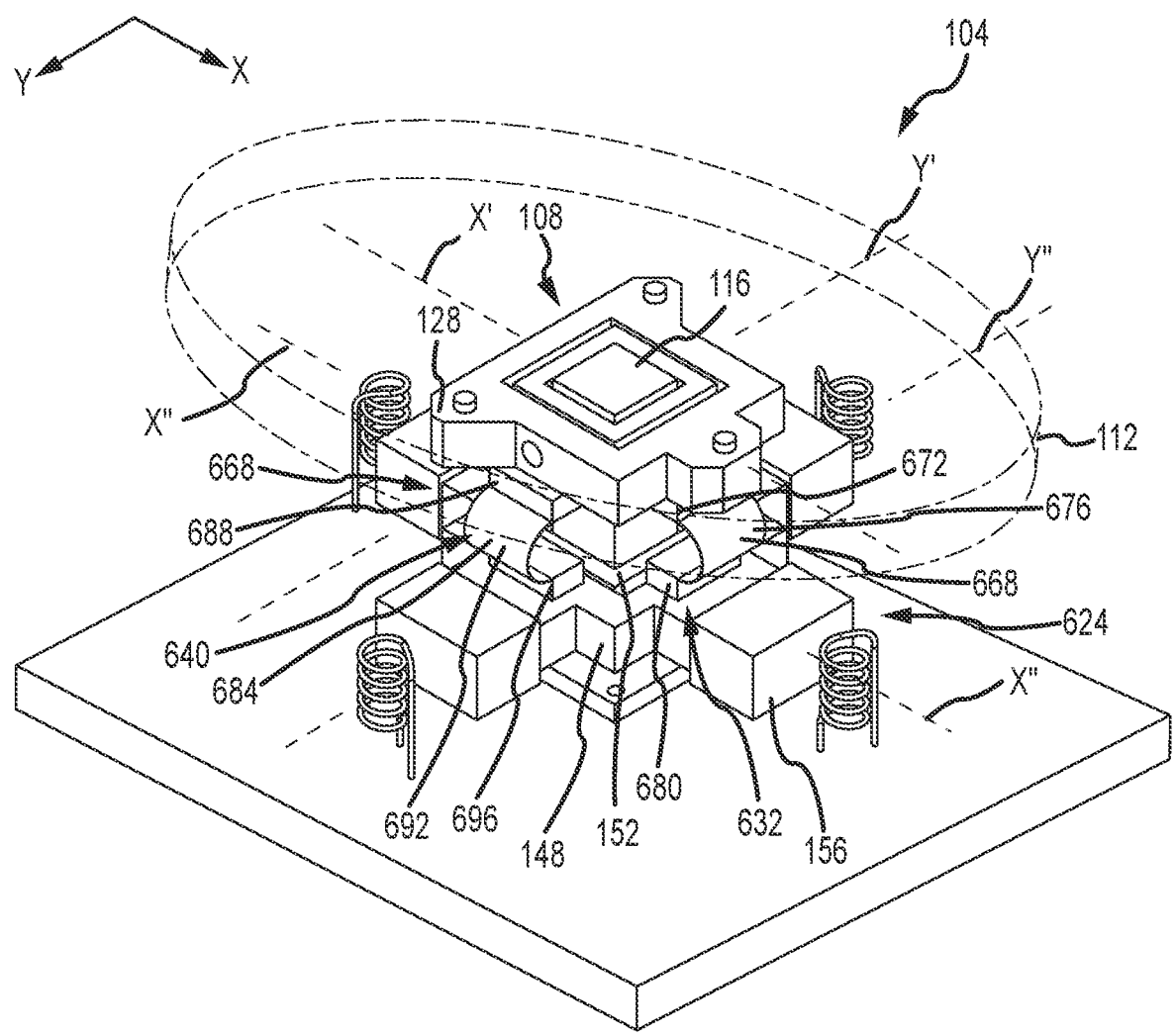

As can be appreciated by one of skill in the art after consideration of the present disclosure, the drive flexures 132 and 140 can operate in tension to transmit movement of the reaction mass 148 to movement of the mirror 112. Moreover, in the example configurations illustrated, the drive flexures 132 and 140 are formed as flexible blades that are integral to the mirror connection 128, the drive flexure frame 136, and the drive flexure reaction mass connection 144. However, other configurations are possible. For example, various components can be formed separately, and fixed to one another. As another example, as an alternative to being formed from flexible blades of material, the drive flexures 132 and 140 can be formed from any material capable of operating in tension to transmit force between components. FIGS. 6A-6C depict components of a scanning mirror assembly 104 incorporating a scanning system 108 in accordance with still other embodiments of the present disclosure. As in other embodiments, a mirror 112 is connected to a post 116 by a mirror gimbal assembly 120, which allows the mirror 112 to rotate about first X' and second Y' axes.

A reaction mass 148 is connected to the post 116 by a reaction mass gimbal 152, which allows the reaction mass 148 to rotate about third X" and fourth Y" axes. In accordance with embodiments of the present disclosure, the mass of the reaction mass 148 and the components moving with the reaction mass 148 is equal to the mass of the mirror 112 and the components moving with the mirror 112. However, in the example configuration depicted in FIGS. 6A-6C, the two degree-of-freedom reactionless pointing and scanning system 108 includes a drive assembly 624 that is configured differently than the drive assembly 124 in the example configurations shown in FIGS. 1-5. In particular, the drive assembly 624 includes a mirror connection 128 that is directly connected to the reaction mass 148 by an X axis drive flexure 632 and by a Y axis drive flexure 640. Accordingly, the drive assembly 624 eliminates the need for a drive flexure frame 136 to interconnect the drive flexures 132 and 140 of other embodiments. This simplified design is enabled by the configuration of the drive flexures 632 and 640, also referred to herein as C-flexures or drives. The first or X axis drive flexure 632 includes a pair of C-flexure elements 668 disposed on opposite sides of the post 116. Each of the C-flexure elements 668 includes a mirror mounting block 672, a selectively flexible blade portion 676, and a reaction mass mounting block 680. A centerline of the C-flexure elements 668 of the X-axis drive flexure 632 passes through the X' and X" axes. Similarly, the second or Y axis drive flexure 640 includes a pair of C-drive elements 684 disposed on opposite sides of the post 116. Each of the C-flexure elements 684 includes a mirror mounting block 688, a selectively flexible blade portion 692, and a reaction mass mounting block 696. A centerline of the C-flexure elements 684 of the second drive flexure 640 passes through the Y' and Y" axes.

As shown in FIGS. 7A and 8A (and also in FIGS. 7C and 8C), the flexible blade portions 676, 692 are curved, and have a C-shaped profile in an elevation taken perpendicular to the axis along which the particular C-flexure element 668 or 684 is aligned. When the scanning system 108 is in a neutral position, the top and bottom edges of the drive elements 668 and 684 are parallel to one another. As depicted in FIGS. 7B and 8B, when the reaction mass 148 is tilted about the X" axis, for example by operation of the actuator coils 160 on opposite sides of the X" axis, the X axis drive flexure 632 transfers an equal but opposite rotational movement to the mirror 112 via the mirror mount 128. In particular, a rotation of the reaction mass 148 about the X" axis in a first direction will result in a rotation of the mirror connection 128 and the connected mirror 112 about the X' axis in a second direction through a shearing force transmitted across the flexible blade portions 676 of the C-drive elements 668 of the X axis drive flexure 632.

More particularly, as depicted in FIGS. 7B and 8B, where the components 148 and 128 are tilted relative to the X' and X" axes, the C-shaped profile of the flexible blade portion 676 is flattened along an edge 804*a* on a first side of the axes X' and X", and the C-shaped profile of that flexible blade portion 676 is steepened along an edge 804*b* on a second side of the axes X' and X". As can be appreciated by one of skill in the art after consideration of the present disclosure, and as shown in FIG. 7B, a tilting of components about the X' and X" axes will cause a distance traversed by a first one of the C-drive elements 684*a* of the second drive flexure 640 to increase, and will cause a distance traversed by a second one of the C-drive elements 684*b* of the second drive flexure to decrease. This change in distance is accommodated by a flattening of the curve of the flexible blade portion 692 of the C-drive element 684*a* on the side of the drive assembly 124 on which the distance is increasing, and a steepening of the curve of the flexible blade portion 692 of the C-drive element 684*b* on the side of the drive assembly 124 on which the distance is decreasing.

Similarly, as depicted in FIGS. 7D and 8D, the Y axis drive flexure 640 transfers an equal but opposite rotational movement between the reaction mass 148 and the mirror 112. In particular, a rotation of the reaction mass 148 about the Y" axis in a first direction will result in a rotation of the mirror connection 128 and the connected mirror 112 about the Y' axis in a second direction through a shearing force transmitted across the flexible blade portions 692 of the C-drive elements 684 of the Y axis drive flexure 640. Moreover, where the components 148 and 128 are tilted relative to the X' and X" axes, the C-shaped profile of the flexible blade portion 692 is flattened along an edge 808*a* on a first side of the axes X' and X", and the C-shaped profile of that flexible blade portion 676 is steepened along an edge 808*b* on a second side of the axes X' and X".

Figure 9A:
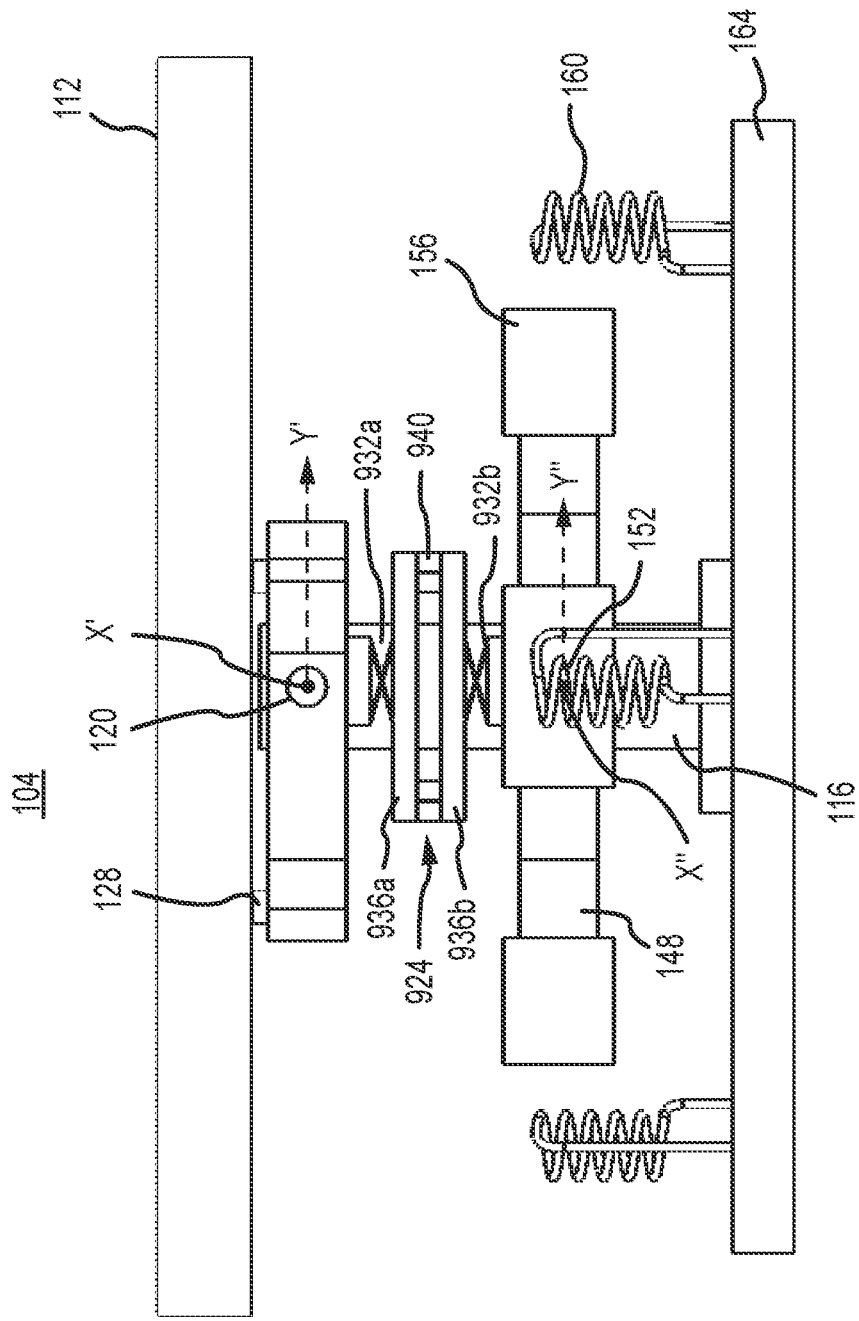
Figure 9B:
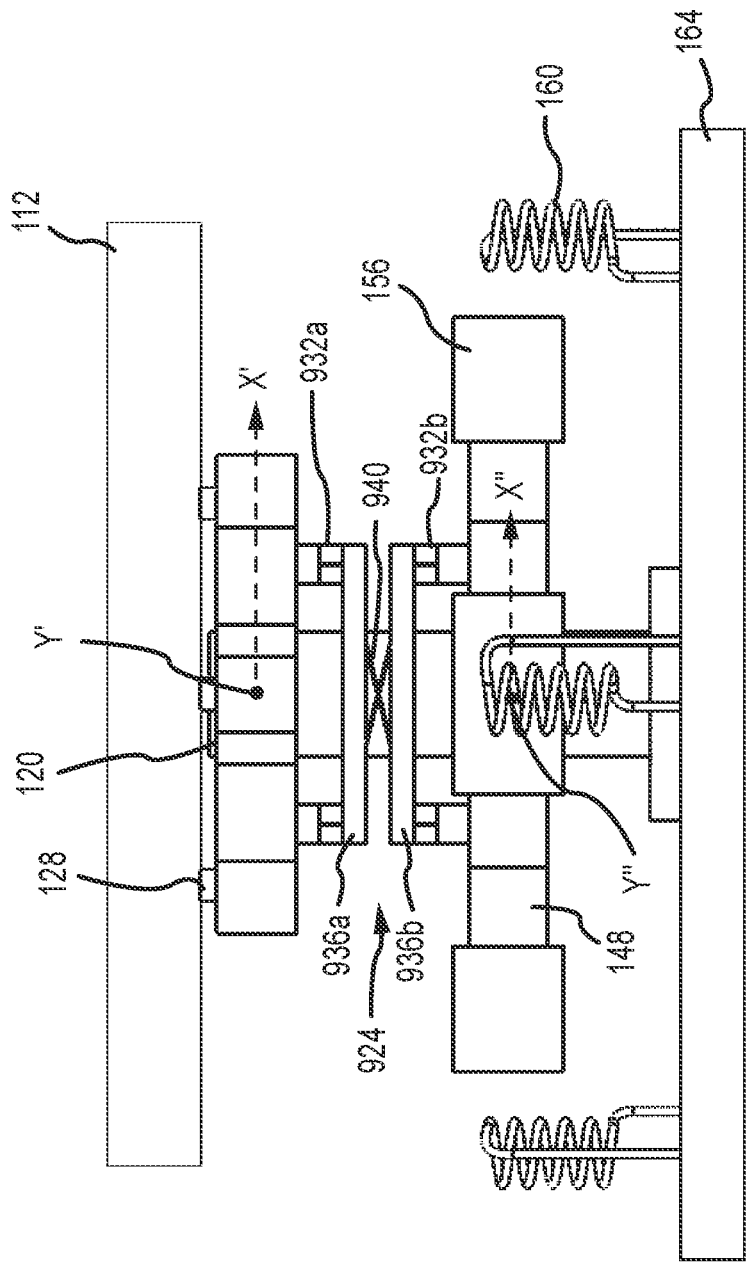

FIGS. 9A, 9B, and 9C are side elevation views of a scanning mirror assembly 104 incorporating a two degree-of-freedom reactionless pointing and scanning system 108 in accordance with further embodiments of the present disclosure. As in other embodiments, a mirror 112 is connected to a post 116 by a mirror gimbal assembly 120, which allows the mirror 112 to rotate about the first X' and second Y' axes. A reaction mass 148 is connected to the post 116 by a reaction mass gimbal 152, which allows the reaction mass 148 to rotate about third X" and fourth Y" axes. As in other embodiments of the present disclosure, the mass of the reaction mass 148 and components moving with the reaction mass 148, such as the actuator core magnets 156 the drive flexure reaction mass connection 144, and components of the reaction mass gimbal assembly 152, is equal to the mass of the mirror 112 and components moving with the mirror 112, such as the mirror connection 128 and the mirror gimbal assembly 120. Accordingly, reactionless operation can be provided.

In this example embodiment, a drive assembly 924 having first 932*a* and second 932*b* pairs of X axis drive flexures is provided. More particularly, and with reference also to FIGS. 10A, 10B, and 10C, the first pair of X axis drive flexures 932*a* are disposed on opposite sides of the post 116 from one another, and connect mirror mounts 128 to an upper drive flexure frame 936*a*. A pair of Y axis drive flexures 940, disposed on opposite sides of the post 116 from one another, connect the upper drive flexure frame 936*a* to a lower drive flexure frame 936*b*. The second pair of X drive flexures 932*b* are also disposed on opposite sides of the post from one another, and connect the lower drive flexure frame 936*b* to reaction mass connections 144.

Figures 10A, 10B:
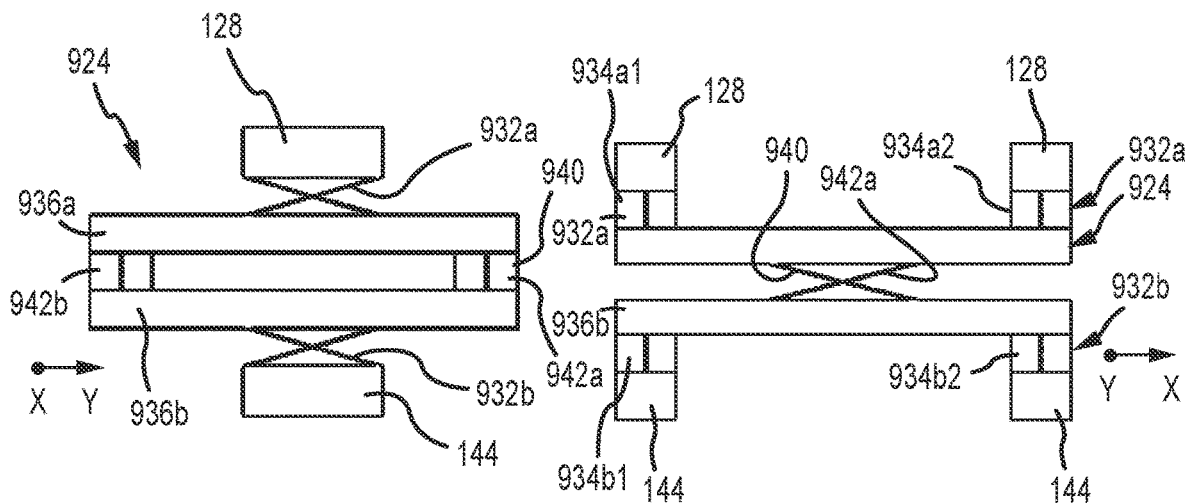
FIGS. 10A, 10B, and 10C are views of a drive assembly in accordance with other embodiments of the present disclosure.
Figure 10C:
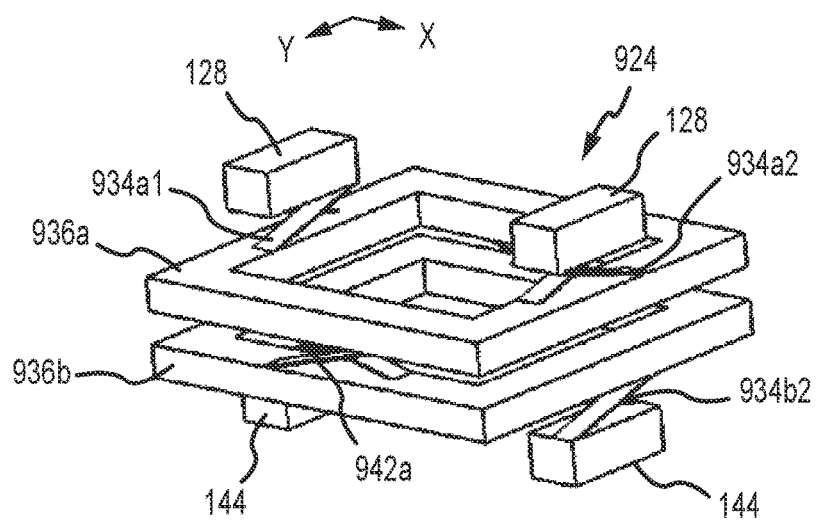

As shown in FIGS. 10A, 10B, and 10C, the upper X axis drive flexure 932*a* includes first and second cross flexure blade sets 934*a*1 and 934*a*2, and the lower X axis drive flexure 932*b* includes first and second cross flexure blade sets 934*b*1 and 934*b*2. The Y axis drive flexure 940 includes first and second cross flexure blade sets 942*a* and 942*b*. In accordance with embodiments of the present disclosure, the blades in each of the blade sets 934 and 942 are independent of one another, to facilitate tilting of the mirror 112 and the reaction mass 148 at larger angles than if the blades were joined to one another at the center of the "X" formed by the blades when the system 108 is in a neutral position. In addition, as in other embodiments, some or all of the components of the drive assembly 924 can be formed from the same piece of material. For example, the components of the drive assembly, from the mirror mounts 128, through the upper X axis drive flexures 932*a*, the upper drive flexure frame 936*a*, the Y axis drive flexures 940, the lower drive flexure frame 936*b*, the lower X axis drive flexures 932*b*, and the reaction mass connection 144 can all be formed from the same piece of metal.

Similar to other embodiments, the X axis drive flexures 932 transfer a rotation of the reaction mass 148 about the X" axis in a first direction to a rotation of the mirror 112 about the X' axis in a second direction that is opposite the first direction, and the Y axis drive flexures 940 transfer a rotation of the reaction mass 148 about the Y" axis in a first direction to a rotation of the mirror 112 about the Y' axis in a second direction that is opposite the first direction. However, by providing first 932a and second 932b X axis drive flexures, the drive flexure frames 932a and 932b and the Y axis drive flexures 940 can "float" relative to the post 116, reducing the potential for binding of the drive assembly 924, particularly when the reaction mass 148 is tilted about the X" and Y" axes (and thus the mirror 112 is tilted about the X' and Y' axes) simultaneously.

A suspension system in accordance with embodiments of the present disclosure provides for the efficient configuration of the reaction mass such that the actuator magnet and core assemblies form the bulk of the reaction mass inertia. Also, the actuator coils are fixed to the base for efficient heat removal while eliminating the need for flexible electronic connection across the gimbal axes. Further, no trim actuators are required since the motion of the scanning mirror is equal and opposite the reaction mass by the use of the interconnecting drive flexure element.

In accordance with at least some embodiments of the present disclosure, components or element of the first drive flexure are formed from a first unitary piece of material, and components or elements of the second drive flexure are formed from as second unitary piece of material. As an example, the drive flexures can be formed by shaping a block of metal using electronic discharge machining techniques. As another example, the drive flexures can be formed using additive manufacturing processes. As still another example, all of the components of the drive assembly are formed from a single, integral piece of metal or other material.

In accordance with embodiments of the present disclosure, the gimbals 120 and 152 can incorporate a flexural pivot assembly, for example as discussed in U.S. Pat. No. 5,620,169. In accordance with further embodiments of the present disclosure, the gimbal can incorporate plain bearings, ball bearings, or the like.

Although various examples of a scanning system 108 used in combination with a mirror 112, such as a fast steering mirror or scanning mirror, have been described, embodiments of the present disclosure are not so limited. For example, a scanning system 108 in accordance with embodiments of the present disclosure can be used as a support for any object, structure, or component in which a reactionless assembly that enables two degrees of freedom of movement about or relative to a base structure is desired.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A scanning mirror assembly, comprising:
    a base structure;
    a post that is fixed to the base structure;
    a mirror mount;
    a mirror, wherein the mirror is fixed to the mirror mount;
    a mirror gimbal, wherein the mirror gimbal connects the mirror to the post and enables the mirror to rotate about first and second axes, wherein the first and second axes are perpendicular to one another, and wherein the first and second axes lie in a first plane;
    a reaction mass mount;
    a reaction mass, wherein the reaction mass is fixed to the reaction mass mount;
    a reaction mass gimbal, wherein the reaction mass gimbal connects the reaction mass to the post and enables the reaction mass to rotate about third and fourth axes, wherein the third axis is parallel to the first axis, wherein the fourth axis is parallel to the second axis, and wherein the third and fourth axes lie in a second plane that is parallel to the first plane; and
    a drive assembly, including:
        a first drive flexure, wherein the first drive flexure at least partially interconnects the mirror mount to the reaction mass mount and includes at least first and second elements aligned along an axis that is parallel to the first and third axes; and
        a second drive flexure, wherein the second drive flexure at least partially interconnects the mirror to the reaction mass and includes at least first and second elements aligned along the second and fourth axes.

2. The scanning mirror assembly of claim 1, further comprising:
    a drive flexure frame;
    a mirror connection; and
    a reaction mass connection, wherein the first drive flexure extends between the mirror connection and the drive flexure frame, and wherein the second drive flexure extends between the drive flexure frame and the reaction mass connection.

3. The scanning mirror assembly of claim 2, wherein the first and second elements of the first drive flexure and the first and second elements of the second drive flexure each include a set of cross flexure blades.

4. The scanning mirror assembly of claim 1, further comprising:
    an upper drive flexure frame; and
    a lower drive flexure frame, wherein the first drive flexure additionally includes third and fourth elements,
    wherein the first and second elements of the first drive flexure are part of a first pair of drive flexures that connect the mirror mount to the upper drive flexure frame,
    wherein the second drive flexure connects the upper drive flexure frame to the lower drive flexure frame, and
    wherein the third and fourth elements of the first drive flexure are part of a second pair of drive flexures that connect the lower drive flexure frame to the reaction mass mount.

5. The scanning mirror assembly of claim 1, wherein the first and second elements of the first drive flexure are first and second C-drive elements.

6. The scanning mirror assembly of claim 5, wherein the mirror mount is divided into a plurality of mirror mount portions, wherein the reaction mass mount is divided into a plurality of reaction mass mount portions, and wherein each of the C-drive elements is joined to or is integral with at least one mirror mount portion and one reaction mass mount portion.

7. The scanning mirror assembly of claim 1, further comprising:
    a first actuator, wherein the first actuator moves the reaction mass about the third axis; and a second actuator, wherein the second actuator moves the reaction mass about the fourth axis.

8. The scanning mirror assembly of claim 7, wherein the first actuator includes a first pair of actuator coils fixed to the base structure and a first pair of magnets fixed to the reaction mass, and wherein the second actuator includes a second pair of actuator coils fixed to the base structure and a second pair of magnets fixed to the reaction mass.

9. The scanning mirror assembly of claim 1, wherein the drive assembly is formed from a single, integral piece of material.

10. The scanning mirror assembly of claim 9, wherein the material is a metal.

11. A drive assembly, comprising:
a post;
a supported element;
a first two-axis gimbal that connects the supported element to the post;
a reaction mass;
a second two-axis gimbal that connects the reaction mass to the post;
a first drive flexure, wherein the first drive flexure moves the supported element in a first direction about a first axis in response to a movement of the reaction mass in a second direction about a second axis, wherein the first axis is parallel to the second axis; and
a second drive flexure, wherein the second drive flexure moves the supported element in a first direction about a third axis in response to a movement of the reaction mass in a second direction about a fourth axis.

12. The drive assembly of claim 11, further comprising:
a drive flexure frame, wherein the first drive flexure is between the supported element and the drive flexure frame, and wherein the second drive flexure is between the drive flexure frame and the reaction mass.

13. The drive assembly of claim 12, wherein the first drive flexure includes first and second sets of blades, and wherein the second drive flexure includes third and fourth sets of blades.

14. The drive assembly of claim 11, wherein the first drive flexure includes a first pair of C-drive elements, and wherein the second drive flexure includes a second pair of C-drive elements.

15. The drive assembly of claim 11, further comprising:
an upper drive flexure frame; and
a lower drive flexure frame, wherein the first drive flexure includes first and second pairs of drive flexures,
wherein the second drive flexure includes a first pair of drive flexures,
wherein the first pair of drive flexures of the first drive flexure is between the supported element and the upper drive flexure frame,
wherein the first pair of drive flexures of the second drive flexure is between the upper drive flexure frame and the lower drive flexure frame,
wherein the second pair of drive flexures of the first drive flexure is between the lower drive flexure frame and the reaction mass.

16. The drive assembly of claim 11, wherein the first and second drive flexures are formed from an integral piece of material.

17. The drive assembly of claim 11, further comprising:
a first pair of magnets fixed to the reaction mass on first and second sides of the post;
a second pair of magnets fixed to the reaction mass on third and fourth sides of the post;
a base, wherein the post is fixed to the base; and
a set of actuator coils, wherein the actuator coils are fixed to the base, and wherein at least one actuator coil is disposed adjacent each magnet in the first and second pairs of magnets.

18. A drive assembly, comprising:
a post;
a supported element;
a first two axis gimbal, wherein the first two axis gimbal connects the supported element to the post;
a reaction mass;
a second two axis gimbal, wherein the second two axis gimbal connects the reaction mass to the post;
a first drive flexure, wherein the first drive flexure is aligned along an X axis, and wherein at least a portion of an interconnection between the supported element and the reaction mass is completed by the first drive flexure; and
a second drive flexure, wherein the second drive flexure is aligned along a Y axis that is perpendicular to the X axis, and wherein at least a portion of the interconnection between the supported element and the reaction mass is completed by the second drive flexure.

19. The drive assembly of claim 18, wherein the first drive flexure translates a movement of the reaction mass about an X" axis in a first direction to a movement of the supported element about an X' axis in a second direction, wherein the second drive flexure translates a movement of the reaction mass about a Y" axis in a third direction to a movement of the supported element about a Y' axis in a fourth direction, wherein the X' and X" axes are parallel to the X axis, wherein the Y' and Y" axes are parallel to the Y axis, and wherein the X axis is perpendicular to the Y axis.

20. The drive assembly of claim 19, further comprising:
a drive flexure frame, wherein the drive flexure frame interconnects the first drive flexure to the second drive flexure.

* * * * *